United States Patent [19]
McKinley et al.

[11] 3,741,353
[45] June 26, 1973

[54] BI-STABLE BRAKE

[75] Inventors: David W. McKinley; James K. Parmerlee, both of Indianapolis, Ind.

[73] Assignee: The United States of America as represented by the Secretary of the Navy, Washington, D.C.

[22] Filed: Oct. 4, 1971

[21] Appl. No.: 186,000

[52] U.S. Cl. .............................. 188/171, 192/18 B
[51] Int. Cl. ............................................. B60t 13/04
[58] Field of Search................... 188/161, 164, 171; 192/18 B, 84 C, 84 PM

[56] References Cited
UNITED STATES PATENTS

| | | | |
|---|---|---|---|
| 2,481,402 | 9/1949 | Dederick | 188/171 |
| 2,701,036 | 2/1955 | Osborne | 188/171 |
| 2,886,149 | 5/1959 | Baermann | 188/161 UX |
| 3,512,618 | 5/1970 | Schafer | 188/161 |

*Primary Examiner*—Duane A. Reger
*Attorney*—R. S. Sciascia and P. S. Callignon

[57] ABSTRACT

A bi-stable brake having an annular spring biased cap armature member with permanent magnets affixed thereto slidable along its axis between an annular disk or plate fixed to a rotatable shaft and a fixed annular electromagnet with a small air gap therebetween to provide engagement of the cap member and the plate initiated by a pulse of current in one polarity through the electromagnet to brake the shaft against rotation maintained by the spring bias and to provide disengagement of the cap member and plate by a pulse of current of opposite polarity to engage and hold the permanent magnets and electromagnet together thereby braking and freeing the shaft in either of two states without continuous electromagnet energization.

4 Claims, 4 Drawing Figures

PATENTED JUN 26 1973 3,741,353

BI-STABLE BRAKE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to electromagnet brakes or clutches and more particularly to bi-stable brakes or clutches requiring no electromagnet energization to hold the brake or clutch in either state.

Prior known such electromagnetic brakes or clutches require electromagnet energization to retain the device in one or the other of its braking or clutching and non-braking or non-clutching states. Power is consumed continuously to hold the device in one of its states.

SUMMARY OF THE INVENTION

In this invention an armature, ring or annular clutch cap member is slidable along its axis a very limited amount with confinement between a plate or annular member fixed to a shaft and an electromagnet element. The armature ring is spring biased away from the electromagnet element into engagement with the plate or annular member to restrain the shaft from rotation. The plate and armature have clutch frictional portions or brake lining thereon for frictional engagement and the armature or annular clutch member includes a ring of permanent magnets engageable with the electromagnet. The plate is fixed to the shaft through resilient spokes to permit dampened oscillations of the shaft upon the brake or clutch being engaged. When the electromagnet is energized by a current of one polarity, the armature will be pulled against th spring bias to engage the permanent magnets with the electromagnet after which the electromagnet can be de-energized, being the brake disengaged state. The brake will remain disengaged by the power of the permanent magnets clinging to the electromagnet poles overcoming spring bias. When the electromagnet is energized by a current of opposite polarity, the armature or cap member will cause the electromagnet and permanent magnets to repel each other sufficiently to allow the spring to bias the armature into engagement with the plate or annular member to produce a brake engaged state preventing rotation of the shaft. The shaft is protected from sudden inertial stops by the resilient spoke connection between the shaft and the annular plate surface. Accordingly, the current to engage or disengage the brake need only be applied by a short pulse and the brake will remain in either of these states without electrical power. It is accordingly a general object of this invention to provide a brake or clutch that requires a mere pulse of electrical power to change the state thereof but will remain in either state indefinitely without electrical power.

BRIEF DESCRIPTION OF THE DRAWING

These and other objects and the attendant advantages, features and uses of the invention will become more apparent to those skilled in the art as a more detailed description proceeds when considered along with the accompanying drawing in which.

DESCRIPTION OF THE PREFERRED EMBODIMENT

Figure 1:
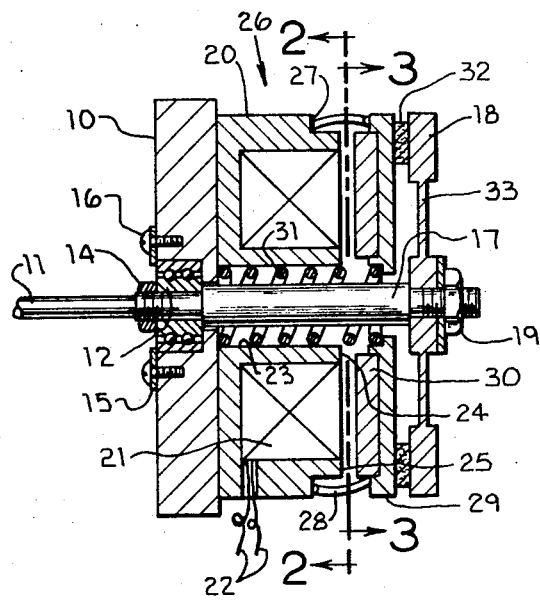
FIG. 1 is a diametric cross-sectional view of the bi-stable brake of this invention.
Figure 2:
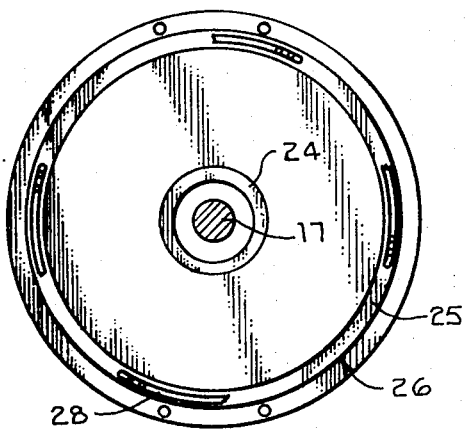
FIG. 2 shows an elevational view along the line 2—2 of FIG. 1.
Figure 3:
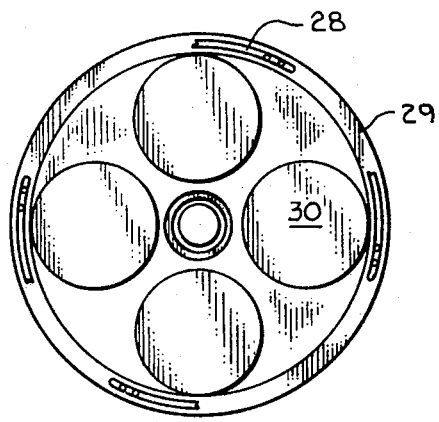
FIG. 3 shows an elevational face view along the lines 3—3 of FIG. 1.
Figure 4:
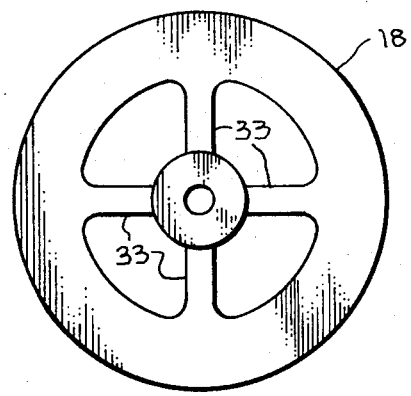
FIG. 4 shows the diametrical plan view of the plate with resilient spokes between the outer periphery braking surface and the inner hub to allow natural frequency of damping oscillations.

Referring more particularly to FIG. 1 a base or mounting plate 10 has a shaft 11 journaled therein by a frictionless type bearing 12 supporting shaft 11 against end play by a nut 14 threaded on shaft 11. The bearing 12 is retained in the support 10 by an annular ring 15 or the like held by cap screws 16. The supporting plate 10 may have eyelets or other means for attachment to a device such as the case of a gyroscope or the like where the shaft 11 is attached to one gyroscope gimbal ring. The shaft 11 has an enlarged portion 17, the outer end of which supports a plate 18 held captive by a nut 19 on the outer threaded end of shaft 11. Affixed to the supporting plate 10 is a cup member 20 housing an electromagnetic coil 21 having control leads 22 connected thereto. The cup member 20 is annular having a central opening 23 through which the enlarged portion 17 of shaft 11 extends. Cup member 20 terminates in inner periphery and outer periphery pole pieces 24 and 25 in an annular plane about the electromagnet 26 consisting of the cup member 20 with coil 21 therein and pole pieces 24 and 25 thereon. The outer periphery of the outer pole piece 25 has a shoulder 27 on which shoulder is attached three or more light weight strips 28. The free ends of the strips 28 are attached to a cap member 29 with at least three and preferably four or more circular permanent magnets 30 embedded therein although other configurations will work as well, such as rectangular magnets. As more particularly shown in FIGS. 2 and 3, the permanent magnets 30 are embedded in one face of the cap 29, the diameter of the permanent magnets 30 being sufficient to span the distance between the inner and outer pole piece ends 24 and 25, as shown in FIG. 2. The permanent magnets 30 are all oriented magnetically on the same radial direction. The cap member 29 is biased away from the electromagnet 26 by a spring 31 compressed between a shoulder in the cap member 29 and the mounting plate 10. The spring strips 28, having one end fastened to the outer pole piece in channel 27 and the other end fastened to the outer periphery of the cap member 29, prevents rotational movement of the cap member. The spring 31 biases the cap member 29 outwardly against the plate 18. An annular brake shoe or brake lining 32 is attached either to the plate 18 or to the outer surface of cap member 29. It also may be desirable or preferable for some applications to have two brake linings or two annular frictional rings with one each attached to one each of the plate member 18 and cap member 29. The plate 18 has spokes 33 connecting the peripheral brake surface with the hub to allow the shaft 11 to be stopped by damped oscillations to avoid damage to the device attached to the shaft, such as a gyroscope gimbal. For some applications it may be desirable to make plate 18 a solid disk. As may be realized from the above description when the cap member 29 is biased outwardly by the spring 31 against the plate member 18 with the lining 32 compressed therebetween, the shaft 11 will be held against rotational movement and is in the brake state. When the cup member 29 is pulled inwardly to the electromagnet, the shaft 11 is free to rotate and is accordingly in the free rotational state.

OPERATION

In the operation of the bi-stable brake let it be assumed that the brake is resting in its braking state as shown in FIG. 1, there being no current applied through the electromagnet coils 21. The shaft 11 is held against rotation since the cap member 29 is held against rotation by the strips 28. When it is desirable to release the shaft for free rotation, a pulse of direct current voltage of one polarity is applied to leads 22 to establish magnetic poles at the inner and outer pole pieces 24 and 25 corresponding to the reversed polarity of permanent magnets 30. That is, if the pulse of direct current voltage applied to leads 22 is such to establish a north pole on the pole piece 24 and a south pole on the pole piece 25 to attract the cap member 29, the permanent magnets 30 will all be oriented magnetically such that their north poles will be along the larger diameter of cap member 29 and their south poles will be around the shorter diameter of cap member 29. This will draw all the permanent magnets 30 into engagement with the pole pieces 24 and 25 and the power of these permanent magnets will be sufficient to overcome the compressive strength of spring 31 thereby holding the cap member 29 out of engagement with the plate 18 allowing free rotation of shaft 11 without any further direct current applied to the electromagnet coils.

When it is again desirable to place shaft 11 in the braking state, it is only necessary to apply a pulse of direct current in the opposite direction to polarize the pole pieces 24 and 25 to make 24 the south pole and 25 the north pole magnetically. This condition will cause the pole pieces 24 and 25 to repel the permanent magnets 30 whereupon the spring 31 will again bias the cap member 29 against the plate 18 placing the shaft in the braking state. If the shaft 11 is in a rotating condition at the time the brake is placed in its braking state, the resilience of spokes 33 in the plate 18 will dampen out oscillations in the shaft 11 to prevent damage to any instrument coupled to the shaft 11, such as a gyroscope gimbal ring. Accordingly, the brake, when placed in its braking state, will bring shaft 11 to a stop in a resilient or dampened manner. Either the braking state or the non-braking state is maintained without any external voltage supply, it only being necessary to apply a direct current voltage pulse to establish either state or condition of the brake.

While many modifications may be made in the constructional details to accomplish the assembly shown and described, it is to be understood that we desire to be limited only in the scope of the appended claims.

We claim:
1. A bistable brake device comprising:
   an annular electromagnet having inner and outer annular poles and having a spring biased concentric non-rotatable armature with permanent magnets affixed thereto;
   a rotatable shaft having an annular disk plate on the opposite side of said armature from said electromagnet providing a small air space of travel for said armature along the axis of said electromagnet engageable between said disk and said electromagnet, said disk plate having concentric hub and rim joined by a plurality of spokes to provide dampened oscillations when said disk plate is braked;
   friction material on at least one of the engageable surfaces of said disk and armature; and
   leads to said electromagnet for applying direct current pulses of opposite polarity thereto, a current pulse of one polarity being effective to attract said armature to said electromagent where it clings by the attractive force of said permanent magnets, and a current pulse of the other polarity being effective to cause the electromagnet to repel said permanent magnets to allow said spring force to hold said armature against said disk braking any rotative action of said shaft whereby the brake is engageable and disengageable respectively by an electric pulse of opposite polarity.

2. A bi-stable brake device as set forth in claim 1 wherein said permanent magnets affixed to said armature cap are oriented with polarity radially the same.

3. A bi-stable brake device as set forth in claim 1 wherein
   said spring biased concentric non-rotatable armature is held against rotation with respect to said electromagnet by light weight leaf material strips having opposite ends attached respectively to said outer annular pole piece and the outer periphery of said armature.

4. A bi-stable brake device as set forth in claim 3 wherein
   said spring biased concentric non-rotatable armature is spring biased by a compression spring around said shaft supported within said inner electromagnet pole.

* * * * *